W. H. HENDEL.
WINDSHIELD PROTECTOR.
APPLICATION FILED MAR. 25, 1920.
1,436,314.
Patented Nov. 21, 1922.
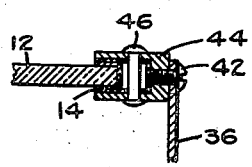
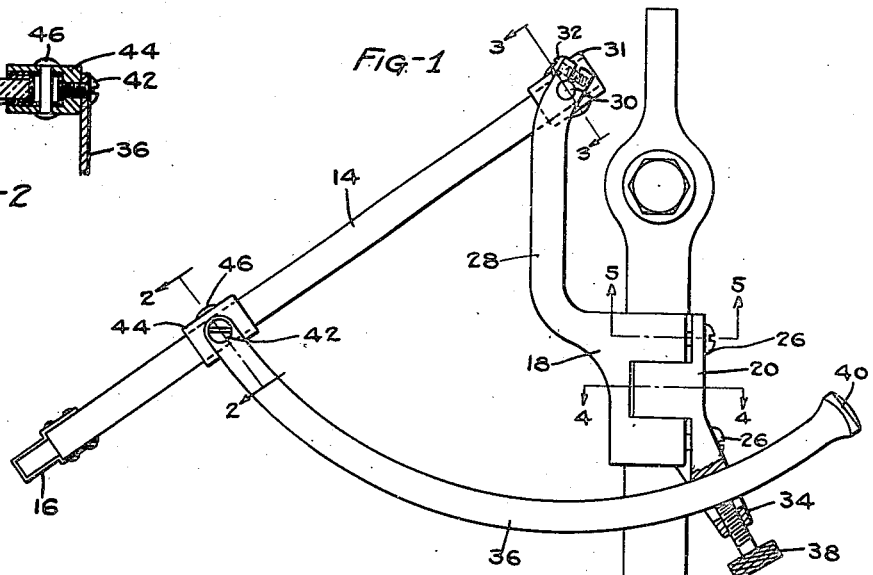
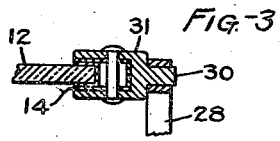
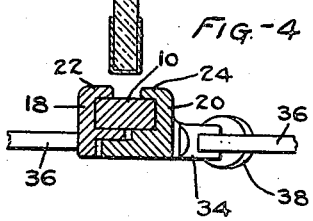
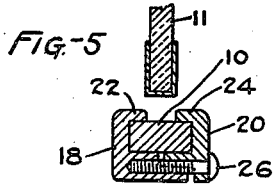
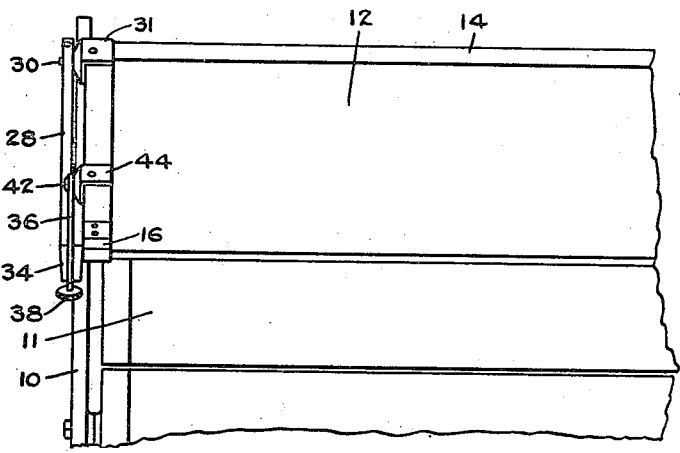
INVENTOR:
WILLIAM H. HENDEL
By Whiteley and
Ruckman
ATTORNEYS.

Patented Nov. 21, 1922.

1,436,314

UNITED STATES PATENT OFFICE.

WILLIAM H. HENDEL, OF MINNEAPOLIS, MINNESOTA, ASSIGNOR TO WESTERN WIND SHIELD WORKS, OF MINNEAPOLIS, MINNESOTA, A CORPORATION.

WINDSHIELD PROTECTOR.

Application filed March 25, 1920. Serial No. 368,625.

*To all whom it may concern:*

Be it known that I, WILLIAM H. HENDEL, citizen of the United States, residing at Minneapolis, in the county of Hennepin and State of Minnesota, have invented certain new and useful Improvements in Windshield Protectors, of which the following is a specification.

My invention relates to wind shield protectors and an object is to provide a device which will prevent rain and snow from striking the glass of the wind shield, particularly at the upper portion thereof, and which will also shield the eyes from the direct glare of the sun when an automobile is being driven toward the sun. Much difficulty is experienced in driving automobiles while it is raining and snowing on account of the vision of the driver through the wind shield being obscured, and when driving into the rays of the sun it is difficult for the driver to see the road or approaching cars and drive his own car with safety. By the employment of my protector a sufficient portion of the wind shield is protected so that the driver may at all times and under any of the above named conditions obtain a clear vision of the road and obects ahead.

The full objects and advantages of my invention will appear in connection with the detailed description thereof and the novel features embodied in my inventive idea will be particularly pointed out in the claims.

In the drawings which illustrate the application of my invention, Fig. 1 is a side view of my protector attached to the wind shield post of an automobile. Fig. 2 is a view in section on the line 2—2 of Fig. 1. Fig. 3 is a view in section on the line 3—3 of Fig. 1. Fig. 4 is a view in section on the line 4—4 of Fig. 1. Fig. 5 is a view in section on the line 5—5 of Fig. 5. Fig. 6 is a front elevational view.

In the construction shown in the drawings the numeral 10 designates one of the posts for supporting the customary wind shield 11. Since the construction for supporting the protector is the same at both its ends a description of the means of support at one end will be sufficient to enable the device to be readily understood. The body member 12 consists of sheet material which is preferably colored glass having a surrounding frame 14 for the top and two sides, while the bottom of the frame has two clips 16 one at each end whereby the glass may be readily replaced upon detachment of the clips. The support for the protector comprises a bracket having two inter-engaging members 18 and 20 provided with inturned flanges 22 and 24 for engagement with the post 10. The member 20 is provided with an extended portion to fit into a cut-out portion in the member 18, as shown in Figs. 1 and 4, and the two members are held together by screw bolts 26. The member 18 is provided with an upwardly and forwardly extending arm 28 the upper end of which is split, as shown in Fig. 1, and hollowed out to constitute a bearing for a trunnion 30 extending out from a clip 31 on the frame 14. A screw 32 serves to determine the frictional fit of the trunnion in its bearing. The member 20 is provided with a downwardly and rearwardly extending arm 34 recessed to receive a curved bar 36 which may be held clamped in desired position by a thumb screw 38. The rear end of the bar 36 is provided with a knob 40 and the front end of the bar is attached by a screw 42 to a clip 44 which is secured to the frame 14 by a rivet 46. The bar 36 is curved on an arc having the trunnion 30 as a center.

The operation and advantages of my invention will be readily understood from the foregoing description. The protector is supported at its top for swinging movement on the two trunnions 30 and may be held in adjusted position by the arms 36 at the two sides when the thumb screws 38 are tightened. The outward adjustment of the protector may be readily accomplished by the driver since the thumb screws 38 and the knobs 40 are back of the wind shield where they are readily reached.

I claim:

A windshield protector comprising a body member of sheet material, a support comprising two cooperating members adapted to be secured around a windshield post, two spaced lugs or projections on one of said members, a lug or projection on the other of said members adapted to be received between said spaced lugs or projections, an arm extending upwardly and forwardly from one of said members, an arm extending downwardly and rearwardly from the other of said members, means for pivotally attaching said body member to said upwardly extending arm, a bar attached to said body member and extending rearwardly beyond said rearwardly extending arm, and means for adjustably securing said bar to said arm.

In testimony whereof I hereunto affix my signature.

WILLIAM H. HENDEL.